United States Patent

Hirai et al.

[11] Patent Number: 6,005,064
[45] Date of Patent: Dec. 21, 1999

[54] THERMOSETTING COMPOUNDS, CURED PRODUCT THEREOF AND METHOD OF PREPARING THE THERMOSETTING COMPOUND

[75] Inventors: Yasuyuki Hirai, Oyama; Teruki Aizawa, Shimodate; Yukio Yoshimura, Kuki, all of Japan

[73] Assignee: Hitachi Chemical Company, Ltd., Tokyo, Japan

[21] Appl. No.: 09/110,160

[22] Filed: Jul. 6, 1998

Related U.S. Application Data

[63] Continuation of application No. 08/665,706, Jun. 18, 1996, abandoned, which is a continuation of application No. 08/359,610, Dec. 20, 1994, abandoned.

[30]    Foreign Application Priority Data

Dec. 27, 1993   [JP]   Japan ..................................... 5-330157

[51] Int. Cl.⁶ .............................. C08G 8/04; C08G 14/10
[52] U.S. Cl. .......................... 528/146; 528/145; 528/149; 528/230; 528/243; 528/254
[58] Field of Search ................... 528/145, 146, 528/149, 230, 243, 254

[56]    References Cited

U.S. PATENT DOCUMENTS

| | | | |
|---|---|---|---|
| 4,396,756 | 8/1983 | Baur et al. | 528/162 |
| 4,501,864 | 2/1985 | Higginbottom | 525/484 |
| 4,507,428 | 3/1985 | Higginbottom . | |
| 4,607,091 | 8/1986 | Schreiber | 528/96 |

FOREIGN PATENT DOCUMENTS

| | | |
|---|---|---|
| 2189455 | 1/1974 | France . |
| 606169 | 10/1978 | Switzerland . |
| 1437814 | 6/1976 | United Kingdom . |

OTHER PUBLICATIONS

Chemical Abstracts of Japan, vol. 111, No. 22, Nov. 27, 1989 Abstract No. 195985r.

Primary Examiner—Duc Truong
Attorney, Agent, or Firm—Antonelli, Terry, Stout & Kraus, LLP

[57]    ABSTRACT

A novel thermosetting compound which is speedily curable, generates no by-products during curing and gives cured products having excellent heat resistance and inflammability.

A thermosetting compound characterized in containing, per molecule, at least one structural unit represented by the formula (A) and at least one structural unit represented by the formula (B) in a (A)/(B) molar ratio of 1/0.25 to 1/9, said structural units being bonded directly or via at least one organic group with one another;

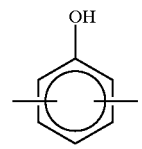

(A)

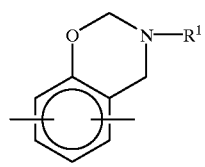

(B)

wherein $R^1$ is a methyl group, a cyclohexyl group, a non-substituted phenyl group or a phenyl group substituted with at least one substituent, and each hydrogen atom on the aromatic rings of (A) and (B), except for one of hydrogen atoms on ortho-positions of the hydroxy group in the aromatic ring of (A), may optionally be replaced with a substituent.

14 Claims, 15 Drawing Sheets

THERMOSETTING COMPOUNDS, CURED PRODUCT THEREOF AND METHOD OF PREPARING THE THERMOSETTING COMPOUND

This application is a Continuation application of application Ser. No. 08/665,706, filed Jun. 18, 1996 now abandoned, the contents of which are incorporated herein by reference in their entirety, which is a Continuation application of application Ser. No. 08/359,610, filed Dec. 20, 1994, now abandoned.

BACKGROUND OF THE INVENTION

The present invention relates to novel thermosetting compounds which hardly generate volatile by-products on curing, cured products thereof and a method for manufacturing the thermosetting compounds.

Thermosetting resins, such as phenolic resins, melamine resins, epoxy resins, unsaturated polyester resins and bis-maleimide resins, are widely used in many industrial fields due to the heat resistance originated from their thermosetting property and to their reliability. These resins however suffer their respective disadvantages, for example, the generation of volatile by-products on curing of phenolic resins or melamine resins, the poor inflammability of epoxy resins and unsaturated polyester resins and the extremely high price of bis-maleimide resins, and, in practical use, such disadvantages have unavoidably been tolerated depending on their uses. To solve this problem, there have been made attempts to develop novel thermosetting resins free from such disadvantages.

One of the attempts resulted in the development of dihydrobenzoxazine compounds (refer to the specification of Japanese Patent Unexamined Publication No. 49-47378 and the specification of U.S. Pat. No. 5,152,939). The compounds are cured by the ring-opening polymerization of the benzoxazine rings, to cause little generation of volatile matters on thermosetting.

However, the curing reaction brings about not so long extension of molecular chains (Polym. Sci. Technol., 31, p.27–49, 1985) and inadequate density of cross-linking, so that softening or thermal deterioration occurs over 200° C.

It is also known that the ring-opening polymerization takes disadvantageously longer curing time as compared with the curing reaction of conventional phenolic resins, resulting in low productivity that limits the industrial use of the compounds.

SUMMARY OF THE INVENTION

The present invention is to overcome the above described problems and to provide a thermosetting compound which is characterized in containing, per molecule, at least one structural unit represented by the formula (A) and at least one structural unit represented by the formula (B) in a (A)/(B) molar ratio of 1/0.25 to 1/9, said structural units being bonded directly or via at least one organic group with one another;

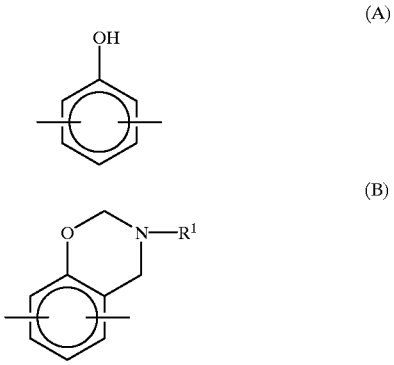

wherein $R^1$ is a methyl group, a cyclohexyl group, a non-substituted phenyl group or a phenyl group substituted with at least one substituent, and each hydrogen atom on the aromatic rings of (A) and (B), except for one of hydrogen atoms on ortho-positions to the hydroxy group in the aromatic ring of (A), may optionally be replaced with a substituent.

DESCRIPTION OF THE PREFERRED EMBODIMENTS

Figure 1:
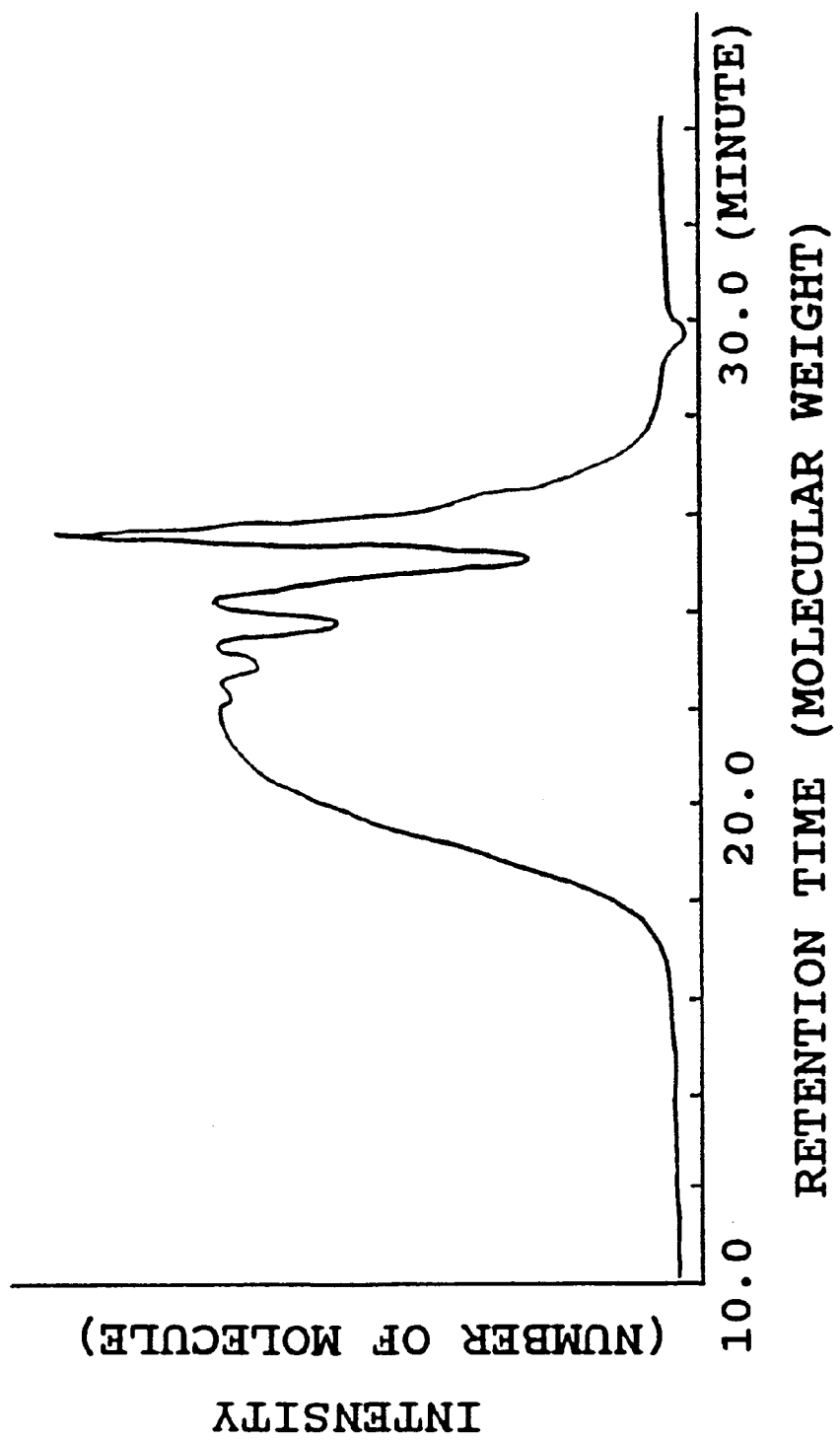
FIG. 1 is a molecular weight distribution curve of the phenol novolac resin synthesized in Example 1.

In the following, the present invention is explained in detail.

The thermosetting compound of the present invention is characterized in containing, per molecule, at least one structural unit represented by the formula (A) and at least one structural unit represented by the formula (B) in a (A)/(B) molar ratio of 1/0.25 to 1/9, said structural units being bonded directly or via at least one organic group with one another;

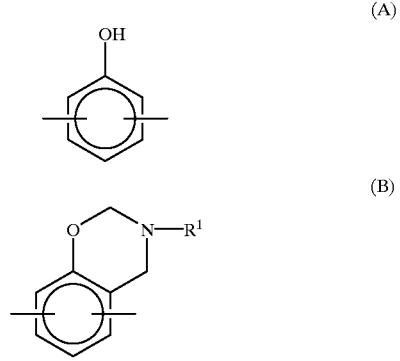

wherein $R^1$ is a methyl group, a cyclohexyl group, a non-substituted phenyl group or a phenyl group substituted with at least one substituent such as a methyl group, a methoxy group, etc., and each hydrogen atom on the aromatic rings of (A) and (B), except for one of hydrogen atoms on ortho-positions to the hydroxy group in the aromatic ring of (A), may optionally be replaced with a substituent such as a methyl group, a t-buthyl group, a halogen atom, etc.

In the thermosetting compound of the present invention, the molar ratio of (A)/(B) is 1/0.25 to 1/9, preferably 1/0.67 to 1/9, more preferably almost 1/1. This is for the reason that when said molar ratio is out of 1/0.25–1/9, the thermosetting compound may have poor properties of curing time or mechanical strength and heat resistance.

In the thermosetting compound of the present invention, each structural unit, namely, (A) and (B), may be contained in various proportions per molecule. However, when the number of the structural units (A) per molecule is m and the number of the structural units (B) per molecule is n, it is necessary to satisfy $m \geq 1$, $n \geq 1$ and $10 \geq m+n \geq 2$, and it is preferable that $10 \geq m+n \geq 3$.

The reason is that the structural units (A) and (B) are previously bonded with one another by stable bonds to make a proper chain length, which imparts the cured products with good properties.

The structural units may be independently bonded directly or via at least one organic group with one another. Some examples of the organic group include alkylene groups and divalent aromatic groups. Some examples of the alkylene groups include the group represented by the formula (C) and a long chain alkylene group having 5 to 30 carbon atoms;

wherein $R^2$ is a hydrogen atom, a methyl group, an ethyl group, a propyl group, an isopropyl group, a nonsubstituted phenyl group or a phenyl group substituted with at least one substituent such as a methyl group, a carboxyl group, etc. Some examples of the divalent aromatic groups include phenylene, xylylene and tolylene.

Each organic group may be the same or different.

The above organic groups may be inserted into the structural units as a series of two or more organic groups.

So long as the thermosetting compound of the present invention does not provide a remarkable degradation of curing speed, mechanical strength and heat resistance, it may contain other component than the structural units represented by the formulae (A) and (B), and the above organic group.

The thermosetting compound of the present invention can be manufactured by reacting primary amine and formaldehyde with a compound which contains at least two hydroxyphenylene groups per molecule, wherein on each hydroxyphenylene group a hydrogen atom is bonded at at least one ortho-position to the hydroxyl group (hereinafter, referred to as "compound containing the reactive hydroxyphenylene groups"), said primary amine being 0.2 to 0.9 moles, preferably 0.4 to 0.9 moles, more preferably 0.5 to 0.7 moles, and said formaldehyde being at least double the molar quantity of the amine, based on one mole of the hydroxyl groups of the hydroxyphenylene groups on said compound containing the reactive hydroxyphenylene groups.

The formaldehyde is used at least double the molar quantity of the amine and may be used in various proportions so long as it does not provide to degrade the efficiency of drying remarkably in the drying step mentioned below.

Concretely, the objective compound is prepared by adding a mixture of the primary amine and the compound containing the reactive hydroxyphenylene groups into the formaldehyde heated to 70° C. or higher, carrying out a reaction for 20 minutes to two hours at 70 to 110° C., preferably 90 to 100° C., and then drying the product in vacuum at 120° C. or lower.

It is essential for the reaction to use 0.2 to 0.9 moles of the primary amine and to use formaldehyde in an amount at least double the molar quantity of the primary amine, based on one mole of the hydroxyl groups of the reactive hydroxyphenylene groups. Less than 0.2 moles of the primary amine cannot make enough dihydrobenzoxazine rings to give sufficient density of cross-linking on curing the obtained compound, and the cured product will be poor in mechanical strength. More than 0.9 moles of the primary amine will give compounds which disadvantageously behave in a manner similar to that of the conventional dihydrobenzoxazine compounds, in other words, give compounds which take long curing time.

The ratio of the primary amine to the compound containing the reactive hydroxyphenylene groups is determined as follows. A compound containing the hydroxyphenylene groups is reacted with a primary amine that is in the amount equimolar with the total hydroxyl groups of the compound, to give a product. The amount of the reacted hydroxyl groups of the compound, namely the reactive hydroxyl groups in the compound containing the hydroxyphenylene groups, is calculated from the weight of the product, and the molar ratio of the primary amine is determined based on the amount of the reactive hydroxyl groups.

Some examples of the compound containing at least two reactive hydroxyphenylene groups per molecule include phenol novolac resins, resol resins, phenol-modified xylene resins, alkylphenol resins, melamine-phenolic resins, phenol-modified polybutadienes and xylylene-modified phenolic resins. As the phenol novolac resins, for example, there may be used the phenol novolac resins having number average molecular weights of 200 to 3000.

It is not essential but preferable that ortho-positions of hydroxyl groups, where crosslinking is to be occur, are not substituted in view of the properties of cured products, and in case of phenol novolac resins, the preferred are so-called random novolac resins, which have low ratios of ortho-substitution and relatively low number average molecular weights.

Novolacs with larger molecular weights, on one hand, give dihydrobenzoxazine compounds with larger molecular weights, but, on the other hand, cause problems of decreasing flowability during molding and increasing difficulty in controlling curing speed.

The above-described resins are mixtures of compounds containing their respective numbers of reactive hydroxyphenylene groups per molecule, and during the preparation, a part of the occurring thermosetting compounds are polymerized with each other. The resulting thermosetting compound of the present invention, therefore, is a mixture of compounds with their respective values of m and n. It is impossible at present to separate the compounds with their respective values of m and n.

Some examples of the primary amine include aliphatic amines and aromatic amines. Aliphatic amines give thermosetting compounds which are quickly curable but give cured products with somewhat inferior heat resistance, and aromatic amines give thermosetting compounds which give cured products with good heat resistance but take longer curing time.

Some examples of the aliphatic amine include a methylamine and a cyclohexylamine, and some examples of the aromatic amine include a nonsubstituted aniline and anilines substituted with at least one substituent such as a methyl group, a methoxy group, etc. Among them, a nonsubstituted aniline is preferred for actual industrial use.

These primary amines may be used singly or as a mixture thereof.

The thermosetting compound of the present invention is cured by heating at 150° C. or higher, preferably at 170 to 220° C. in the absence of catalysts or curing agents without generating by-products. Further, the thermosetting compound can be cured more quickly than the conventional dihydrobenzoxazine compounds.

The curing of the dihydrobenzoxazine compounds proceeds by the interaction between hydroxyl groups neighbored at ortho-positions by hydrogen atoms and dihydrobenzoxazine rings. The thermosetting compound of the present invention contains in its molecule hydroxyl groups neighbored at ortho-positions by hydrogen atoms and dihydrobenzoxazine rings both in proper amounts. This seems to make the curing reaction occur easily.

The compound of the present invention contains in molecule dihydrobenzoxazine rings in a smaller ratio as compared with the conventional dihydrobenzoxazines. The compound containing per molecule at least two reactive hydroxyphenylene groups, which are used for the preparation of the compound of the present invention, has essentially high heat resistance and inflammability. The characteristics remain in the compound of the present invention and endow it with high heat resistance and inflammability.

The thermosetting compound of the present invention can be used as a component of a molding material.

A molding material can be manufactured, for example, by mixing the thermosetting compound of the present invention and a glass fiber, etc., kneading the mixture and pulverizing it. A molded product can be manufactured by heating and curing the molding material in a mold.

The thermosetting compound of the present invention can be used as a component of a composition used for manufacturing a varnish. This varnish can be manufactured by dissolving the thermosetting compound of the present invention, and if necessary, an epoxy resin or epoxy resins, etc. in a solvent or solvents such as methyl ethyl ketone, methylcellosolve, etc.

The present invention will be described in detail with reference to the following Examples, which however are not to be construed to limit the scope of the invention.

EXAMPLE 1

(1) Synthesis of a Phenol Novolac Resin

In 5-liter flask were placed 1.9 kg of phenol, 1.0 kg of formalin (37% aqueous solution) and 4 g of oxalic acid, and were reacted at reflux temperature for 6 hours. Then, the internal pressure was reduced to 6666.1 Pa or lower to remove unreacted phenol and water. The resulting resin had a softening point of 84° C. (ring and ball method) and a tri- or more nuclear products/dinuclear product ratio of 82/18 (the ratio of peak areas measured by gel-permeation chromatography). FIG. 1 shows the molecular weight distribution curve of the obtained phenol novolac resin. This molecular weight distribution curve was measured by liquid chromatography. The horizontal axis shows the retention time, that is, molecular weight. The longer the retention time is, the smaller the molecular weight is. The vertical axis shows the intensity measured by the detector in the liquid chromatography, that is, number of molecule.

Figure 2:
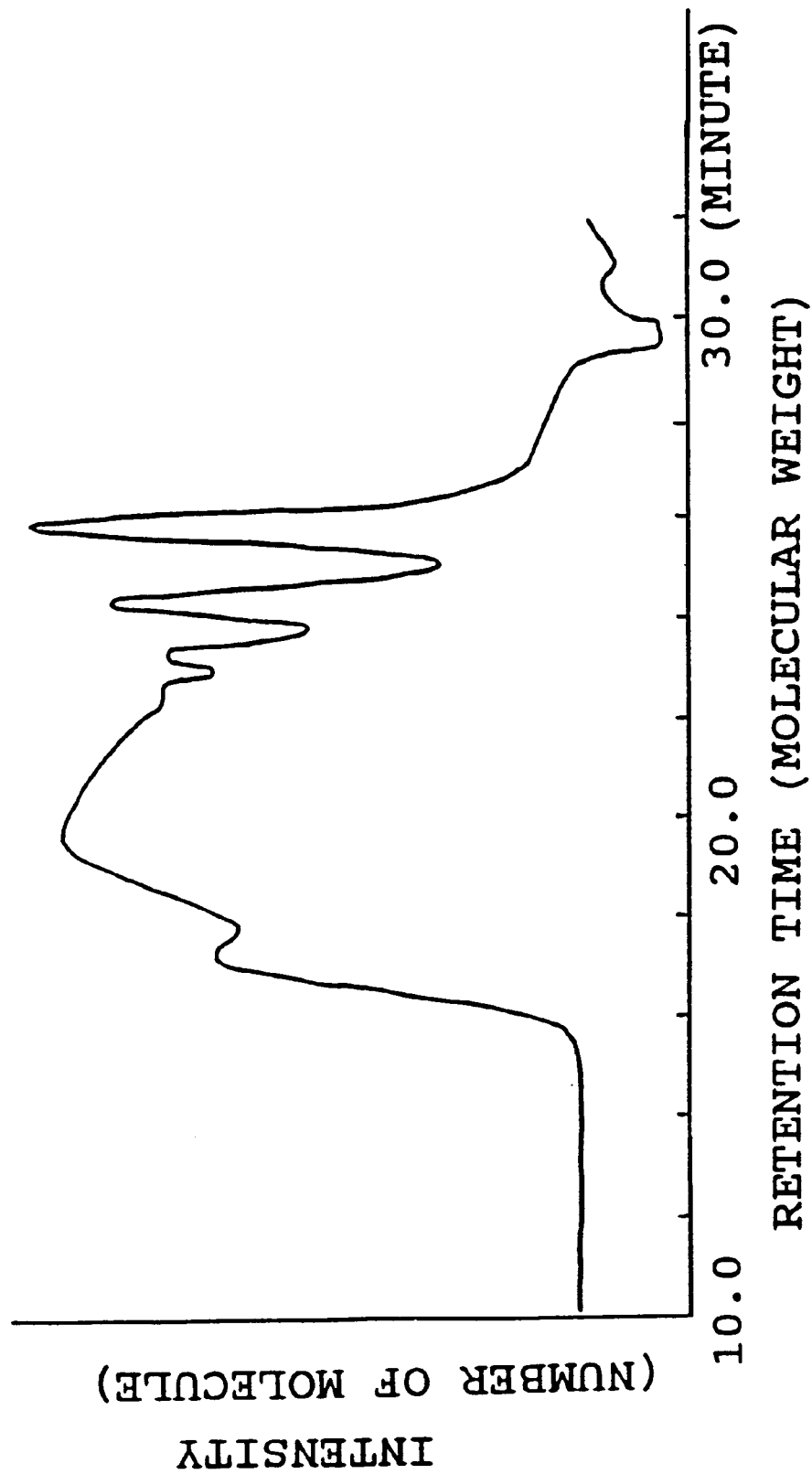
FIG. 2 is a molecular weight distribution curve of the thermosetting compound obtained in Example 1.
Figure 8:
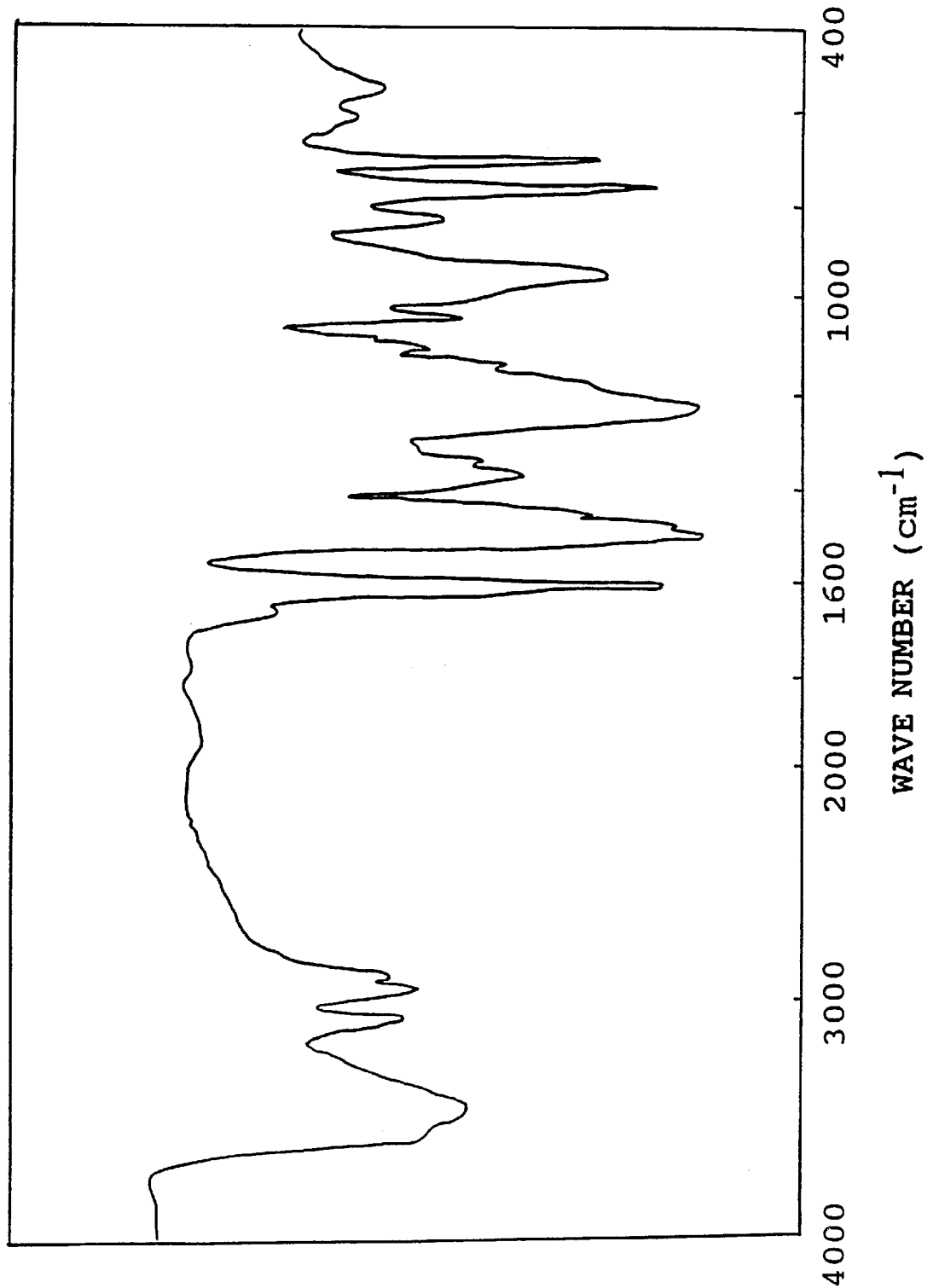
FIG. 8 is an IR spectrum of the thermosetting compound obtained in Example 1.
Figure 12:
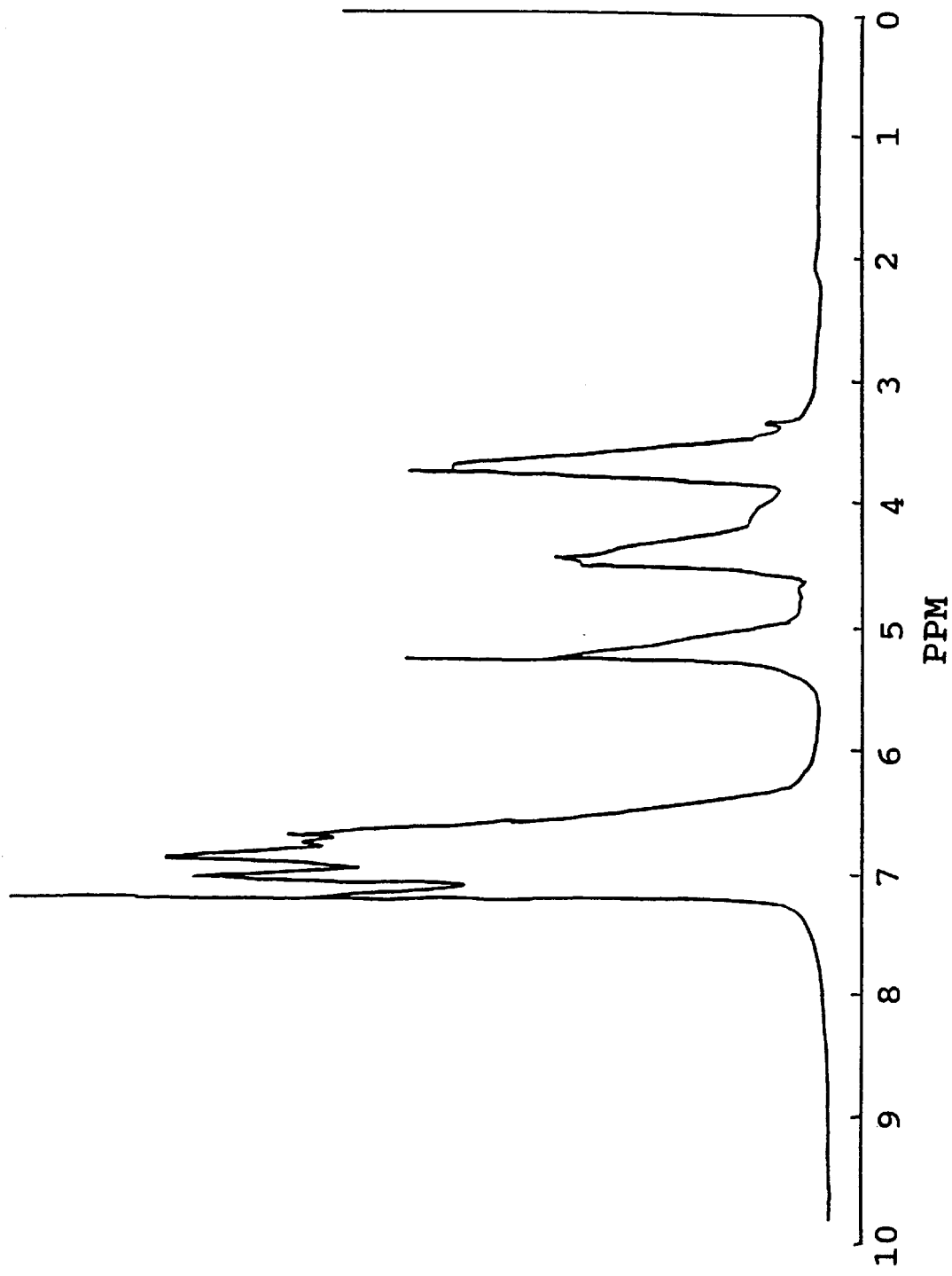
FIG. 12 is a NMR spectrum of the thermosetting compound obtained in Example 1.

(2) Introduction of Dihydrobenzoxazine Rings 1.70 kg (corresponding to 16 moles of hydroxyl groups) of the phenol novolac resin synthesized as above was mixed with 0.93 kg (10 moles) of aniline, followed by stirring at 80° C. for 5 hours to form a uniform solution mixture. 1.62 kg of formalin was placed in a 5-liter flask and was heated to 90° C., and the novolac/aniline mixture was added thereto over a 30 minutes interval. After the completion of the addition, the mixture was heated at the reflux temperature for 30 minutes, and the condensed water was removed at a reduced pressure of 6666.1 Pa or lower at 100° C. for two hours, to give a thermosetting compound in which 71% of reactive hydroxyl groups had been converted into dihydrobenzoxazine rings. FIG. 2 shows the molecular weight distribution curve measured in the same manner as FIG. 1, FIG. 8 shows the IR spectrum, and FIG. 12 shows the NMR spectrum of the obtained thermosetting compound.

The amount of the reactive hydroxyl groups was calculated as follows.

1.70 kg (corresponding to 16 moles of hydroxyl groups) of the phenol novolac resin synthesized in (1) was reacted with 1.49 kg (16 moles) of aniline and 2.59 kg of formalin in the same manner, to synthesize another thermosetting compounds in which all the reactive hydroxyl groups had been converted into dihydrobenzoxazine rings. The excessive aniline and formalin were removed during drying, to give 3.34 kg of the thermosetting compound. This means that 14 moles of the hydroxyl groups of the phenol novolac resin underwent the reaction to form dihydrobenzoxazine rings.

Accordingly, the ratio of dihydrobenzoxazine rings converted from the reactive hydroxyl groups is estimated to be 71% (10 moles/14 moles).

(3) Curing of the Thermosetting Compound

The thermosetting compound synthesized as above was pulverized, was filled in a mold of 100×100×4 mm in internal sizes, and was heated and pressed at 200° C. at 1.96 MPa for 10 minutes, to give a cured product. The properties of the cured product are listed in Table 1.

EXAMPLE 2

(1) Synthesis of a Phenol Novolac Resin

Figure 3:
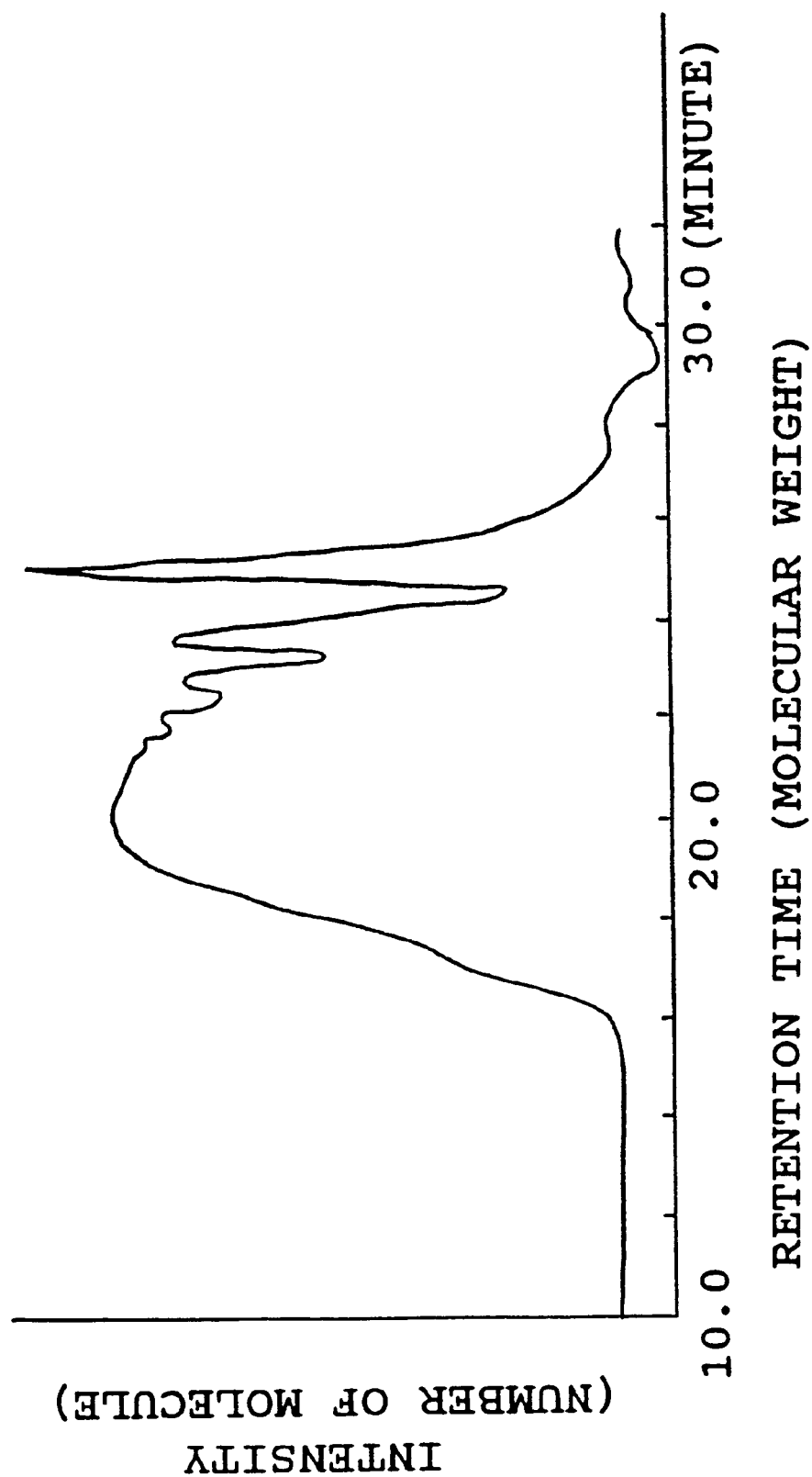
FIG. 3 is a molecular weight distribution curve of the phenol novolac resin synthesized in Example 2.

Into a 5-liter flask were placed 1.90 kg of phenol, 1.15 kg of formalin (37% aqueous solution) and 4 g of oxalic acid, and a phenol novolac resin was synthesized in the same manner as in Example 1. The resulting resin had a softening point of 89° C. (ring and ball method) and a tri- or more-nuclear products/dinuclear product ratio of 89/11 (the ratio of peak areas measured by gel-permeation chromatography). FIG. 3 shows the molecular weight distribution curve of the obtained phenol novolac resin and was measured in the same manner as FIG. 1.

(2) Introduction of Dihydrobenzoxazine Rings

Figure 4:
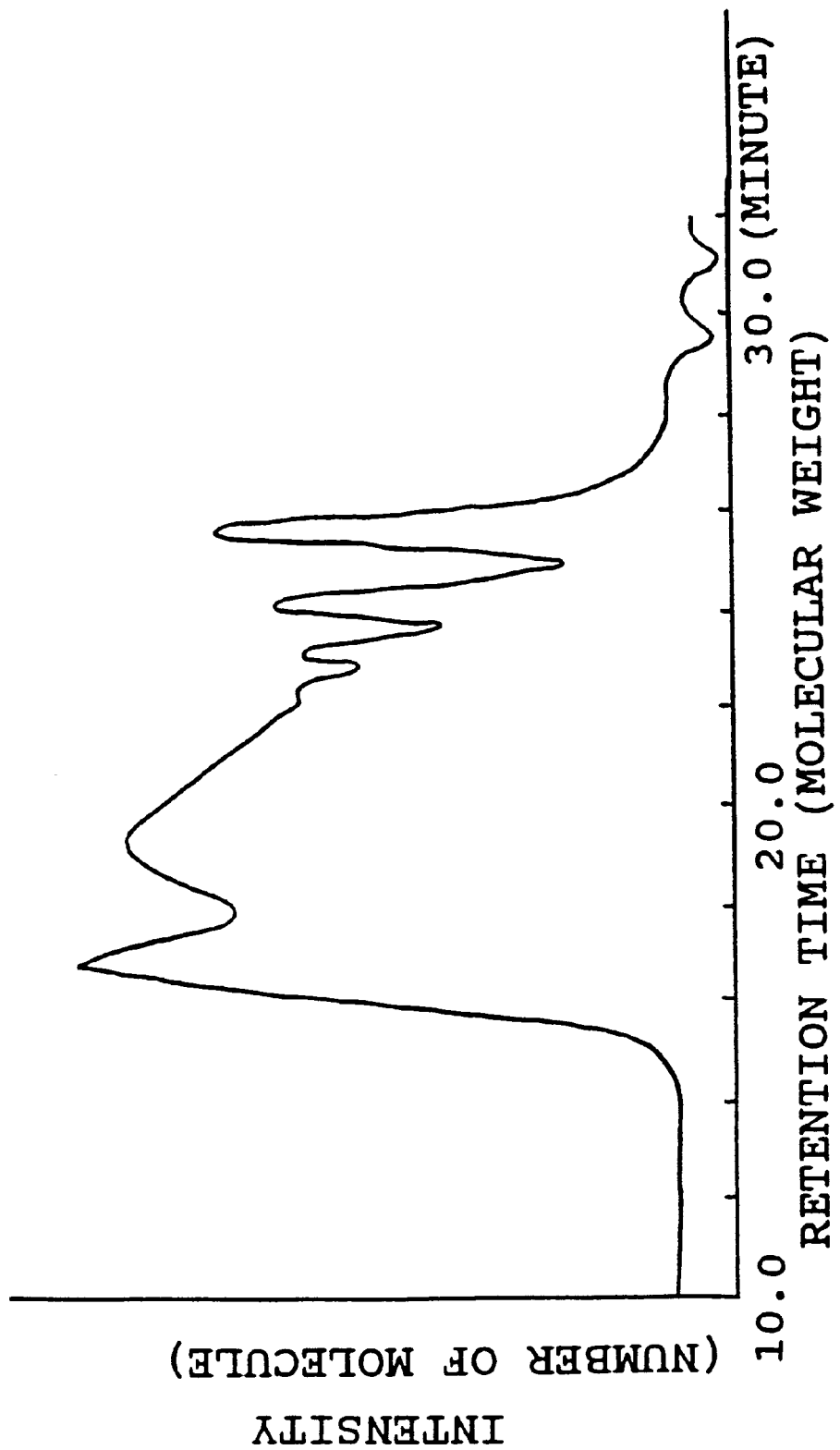
FIG. 4 is a molecular weight distribution curve of the thermosetting compound obtained in Example 2.
Figure 9:
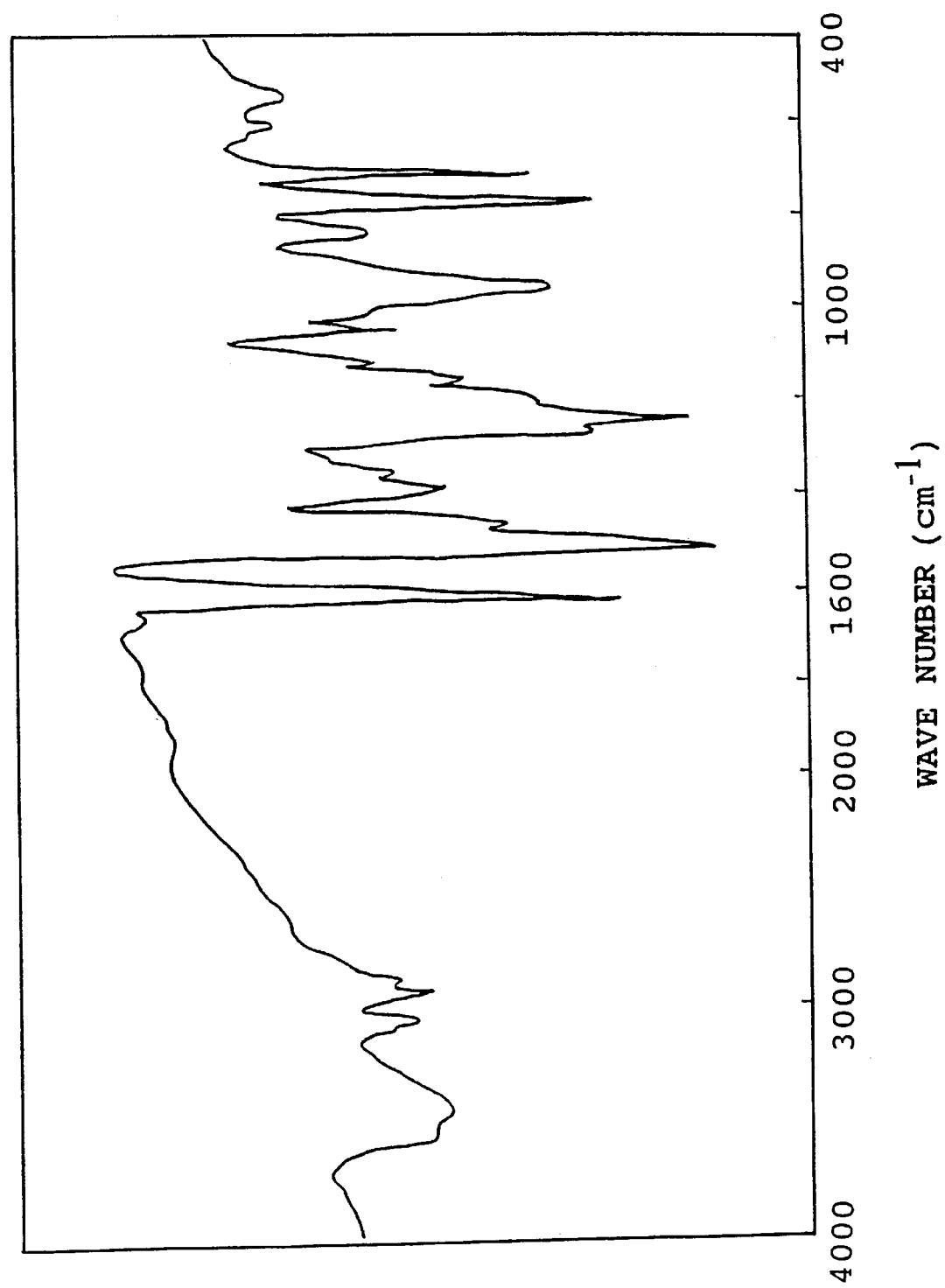
FIG. 9 is an IR spectrum of the thermosetting compound obtained in Example 2.
Figure 13:
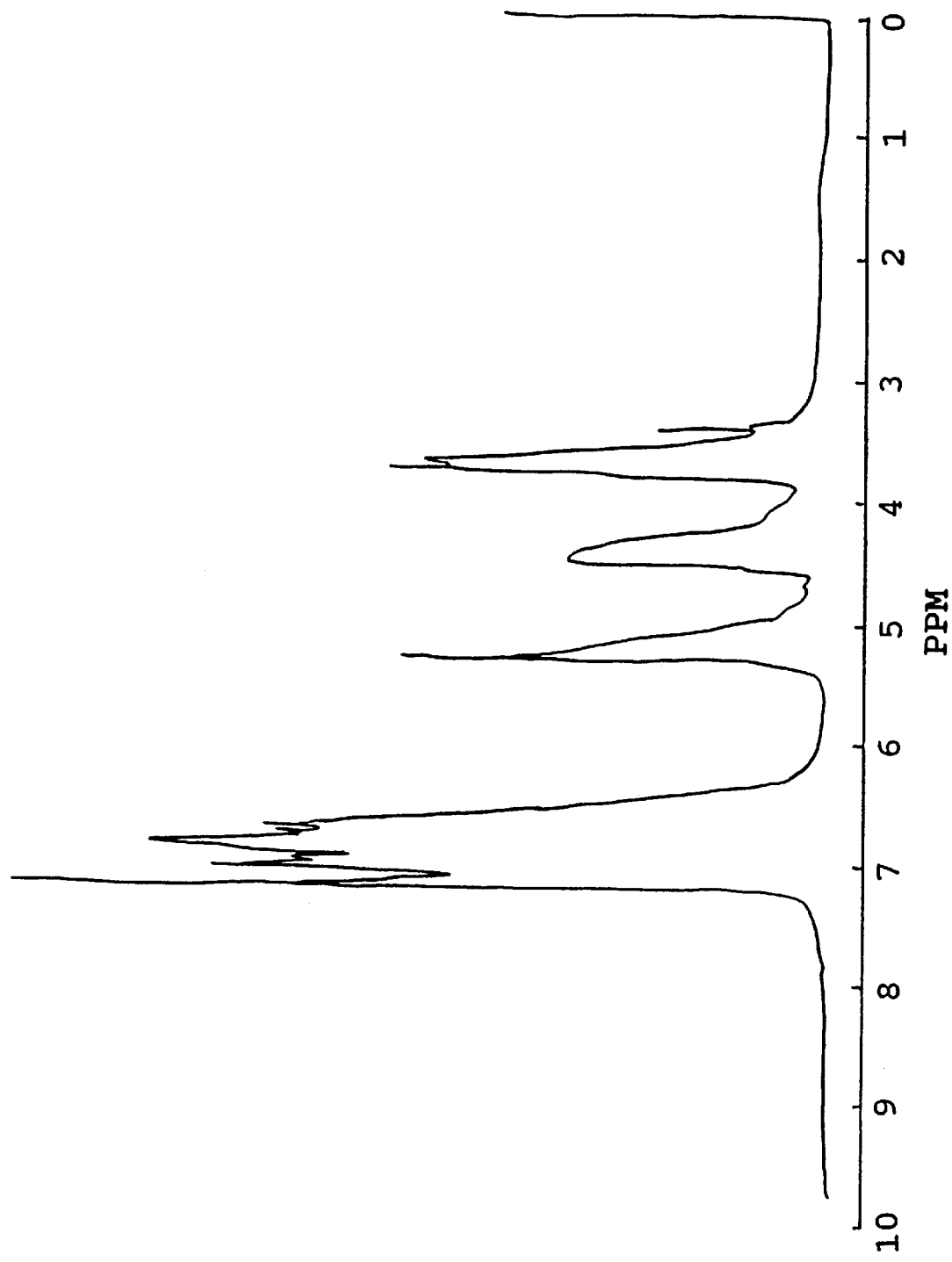
FIG. 13 is a NMR spectrum of the thermosetting compound obtained in Example 2.

The introduction of dihydrobenzoxazine rings was carried out in the same manner as in Example 1 by using 1.70 kg of the phenol novolac resin (total hydroxyl groups: 16 moles, reactive hydroxyl groups: 13.3 moles), 0.93 kg (10 moles) of aniline and 1.62 kg (20 moles) of formalin, to give a thermosetting compound, wherein 75% of the reactive hydroxyl groups of the phenol novolac resin converted into dihydrobenzoxazine rings. FIG. 4 shows the molecular weight distribution curve measured in the same manner as FIG. 1, FIG. 9 shows the IR spectrum, and FIG. 13 shows the NMR spectrum of the obtained thermosetting compound.

(3) Curing of the Thermosetting Compound

A cured product was produced in the same manner as in Example 1. The properties of the cured product are listed in Table 1.

EXAMPLE 3

Figure 5:
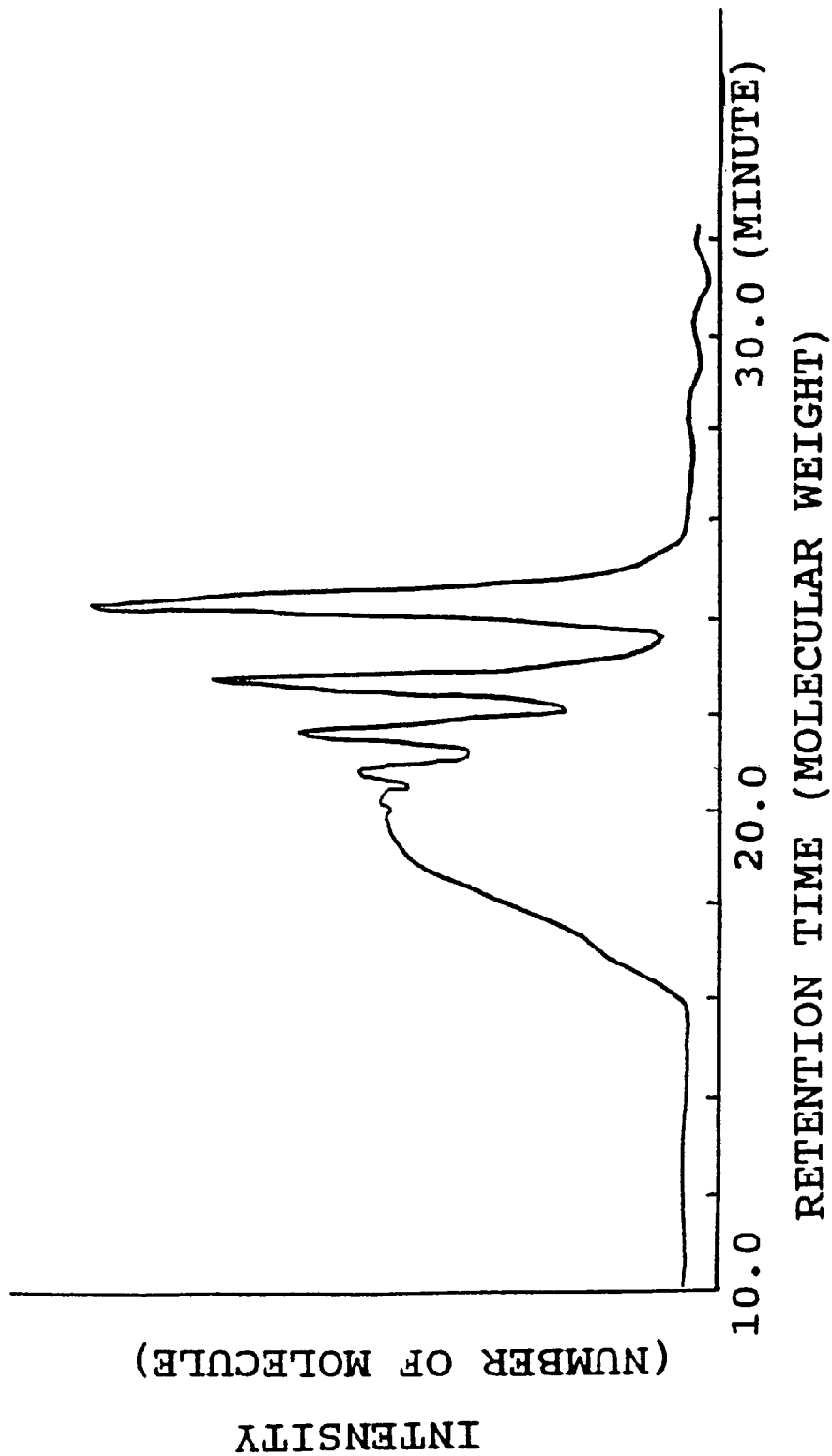
FIG. 5 is a molecular weight distribution curve of the xylylene-modified phenolic resin used in Example 3.
Figure 6:
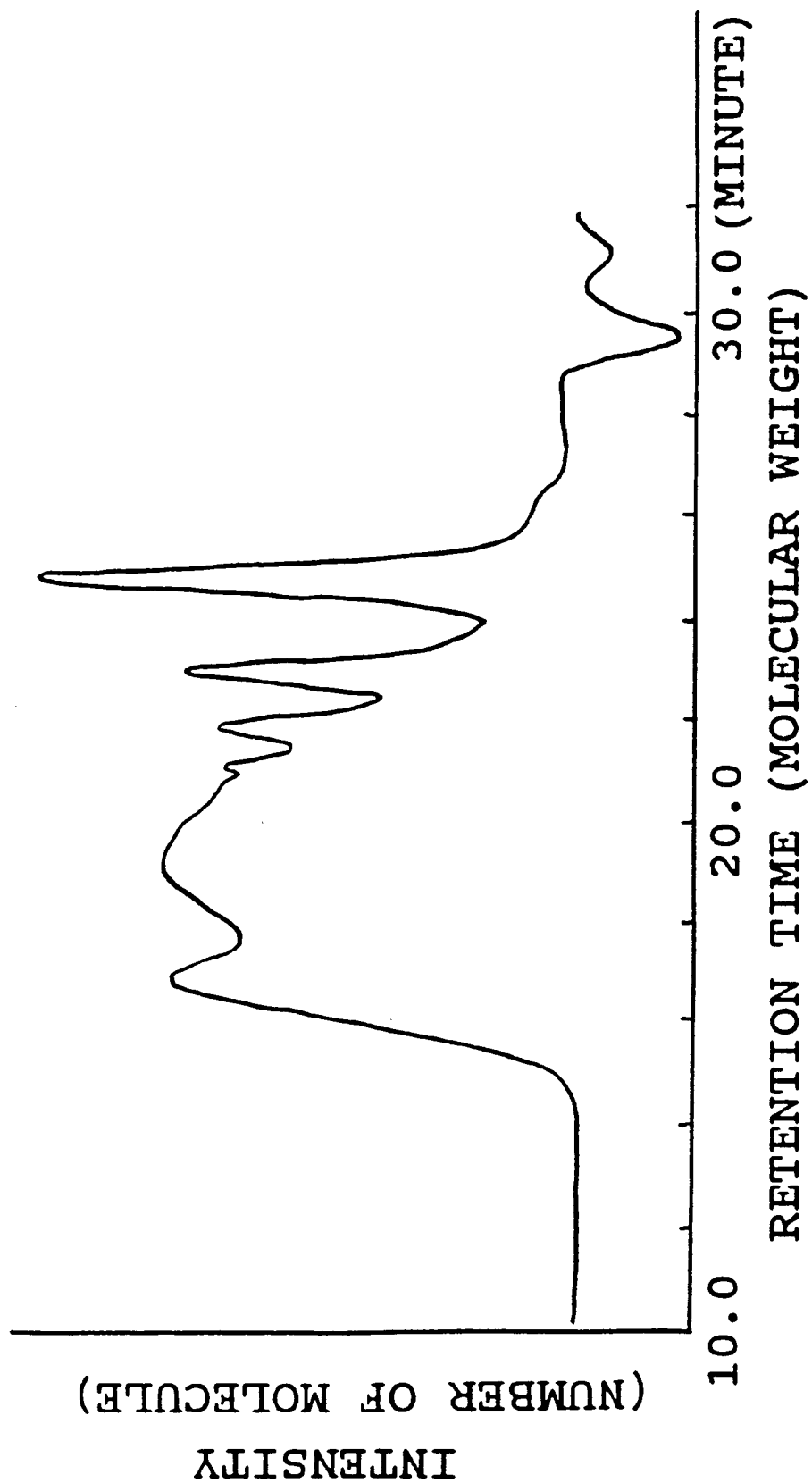
FIG. 6 is a molecular weight distribution curve of the thermosetting compound obtained in Example 3.
Figure 10:
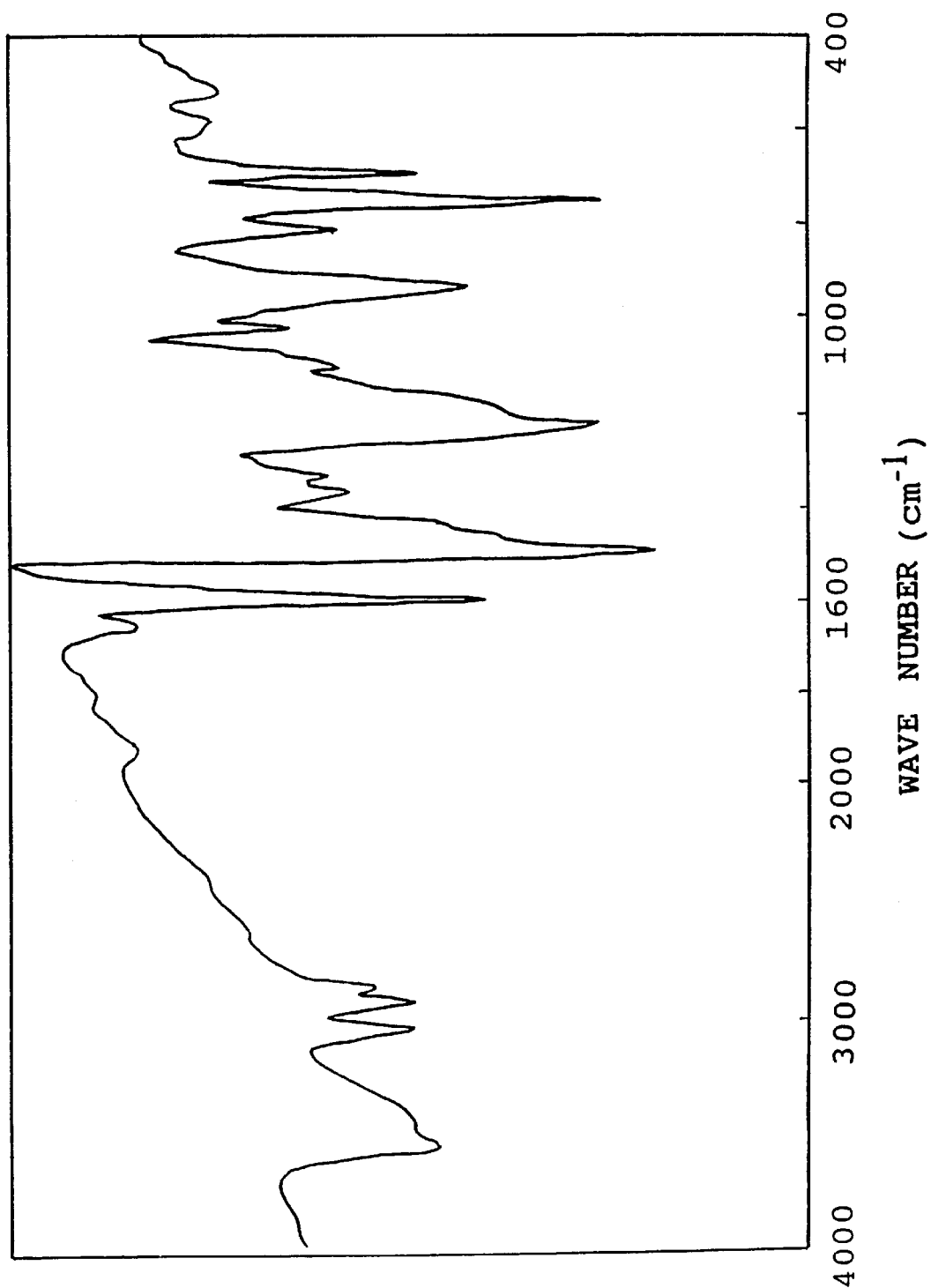
FIG. 10 is an IR spectrum of the thermosetting compound obtained in Example 3.
Figure 14:
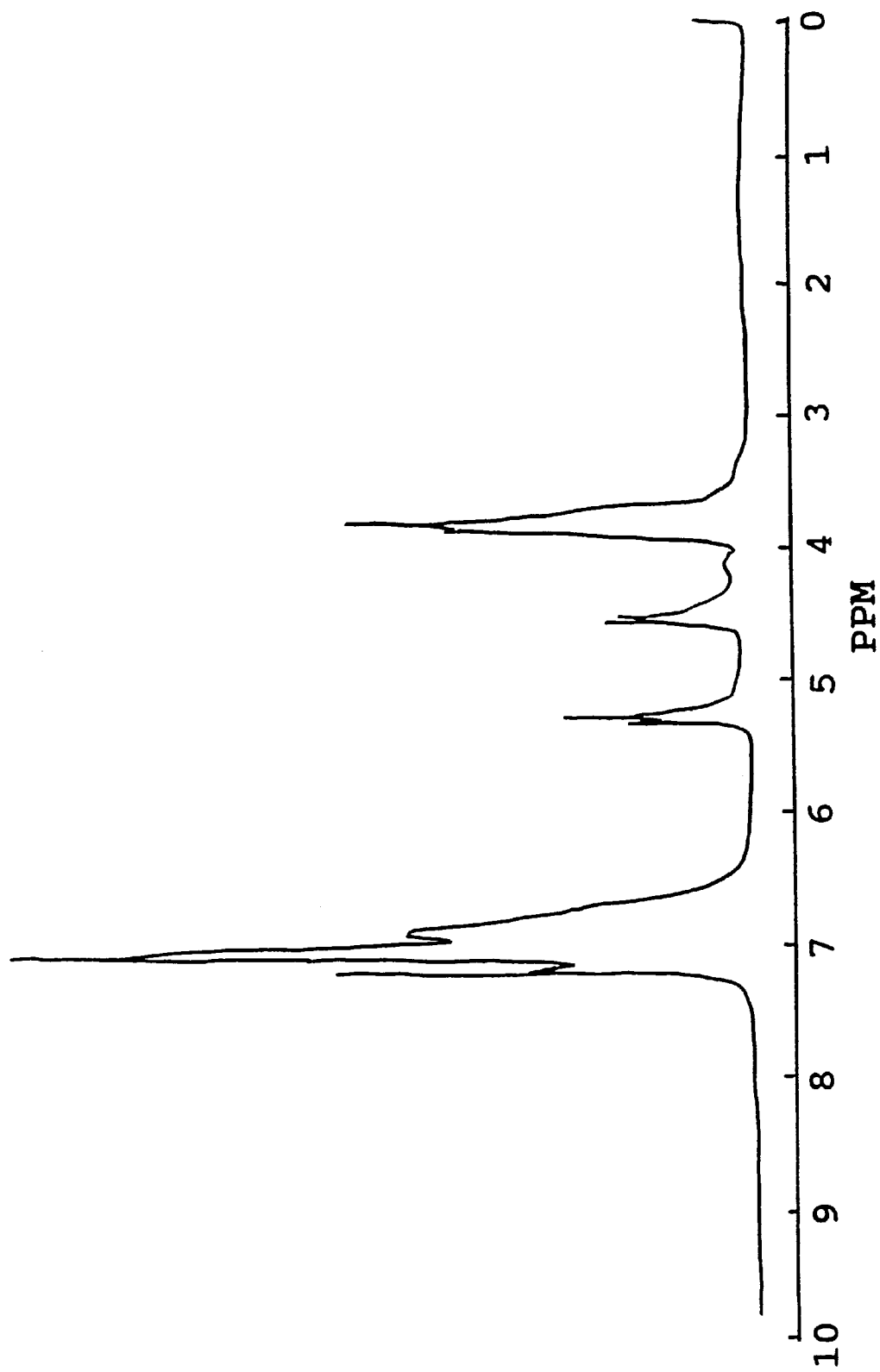
FIG. 14 is a NMR spectrum of the thermosetting compound obtained in Example 3.

The procedure of Example 1 was repeated with the exception that 1.70 kg (corresponding to 10 moles of hydroxyl groups) of a xylylene-modified phenolic resin (produced by Mitsui Toatsu Chemicals, Inc., Trade name: MILEX XL-225-3L), 0.52 kg (5.6 moles) of aniline and 0.91 kg of formalin were used, to synthesize a thermosetting compound wherein dihydrobenzoxazine rings were introduced. FIG. 5 shows the molecular weight distribution curve of the starting xylylene-modified phenolic resin. FIG. 6 shows the molecular weight distribution curve, FIG. 10 shows the IR spectrum, and FIG. 14 shows the NMR spectrum of the obtained thermosetting compound wherein dihydrobenzoxazine rings had been introduced. FIG. 5 and FIG. 6 were measured in the same manner as FIG. 1.

A cured product was produced in the same manner as in Example 1.

As to the xylylene-modified phenolic resin, the amount of the reactive hydroxyl groups was calculated as follows.

2.62 kg of a thermosetting compound wherein dihydrobenzoxazine rings were introduced was prepared by using 1.70 kg (corresponding to 10 moles of hydroxyl groups) of the xylylene-modified phenolic resin, 0.93 kg (10 moles) of aniline and 1.62 kg of formalin. The excessive aniline and formalin were removed during drying. From the weight of the thermosetting compound, the amount of the reactive hydroxyl groups were calculated to be 7.9 moles. Accordingly, the ratio of dihydrobenzoxazine rings converted from the reactive hydroxyl groups is estimated to be 71% (5.6 moles/7.9 moles). The properties of the cured product are listed in Table 1.

EXAMPLE 4

Figure 7:
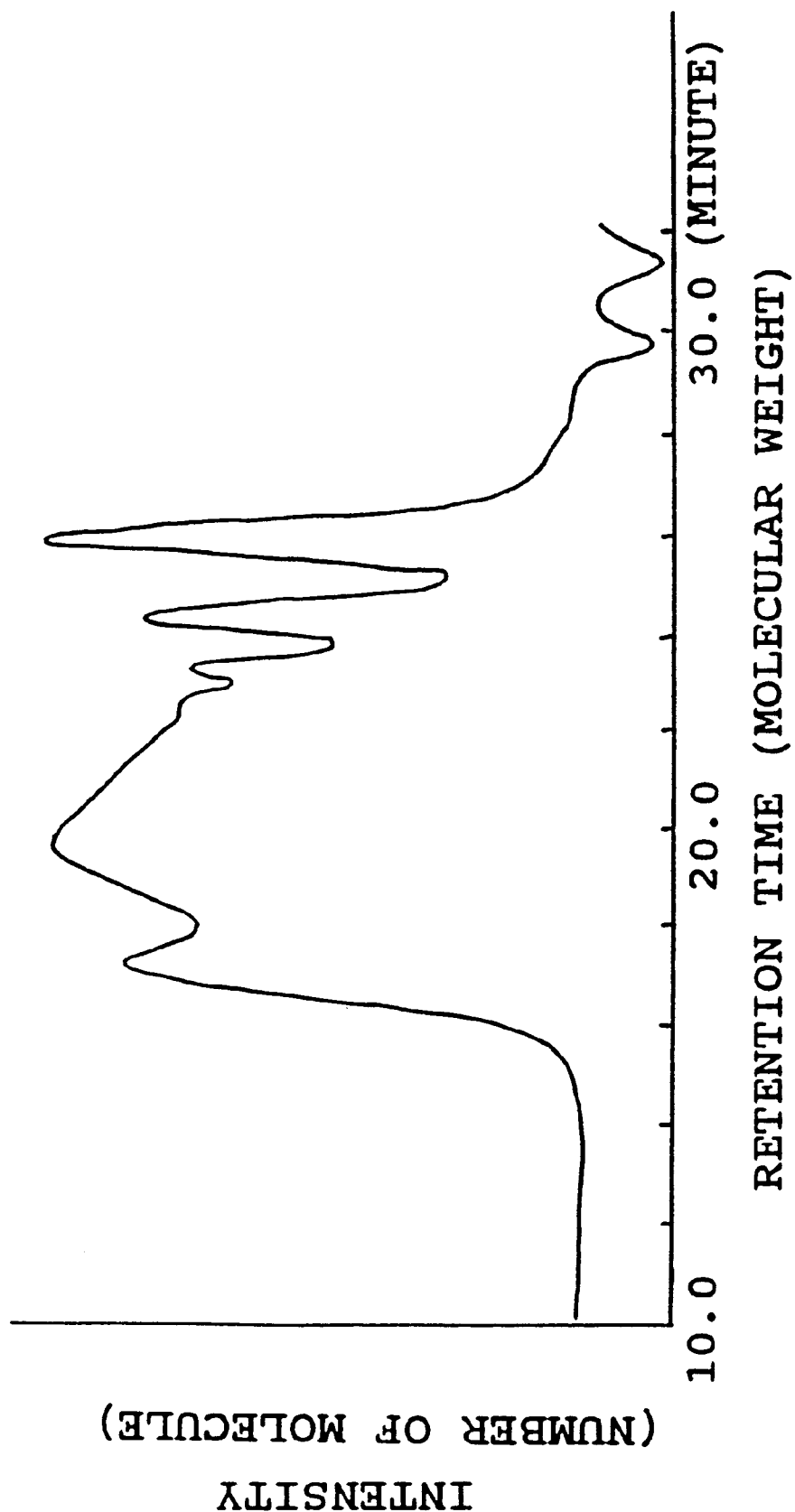
FIG. 7 is a molecular weight distribution curve of the thermosetting compound obtained in Example 4.
Figure 11:
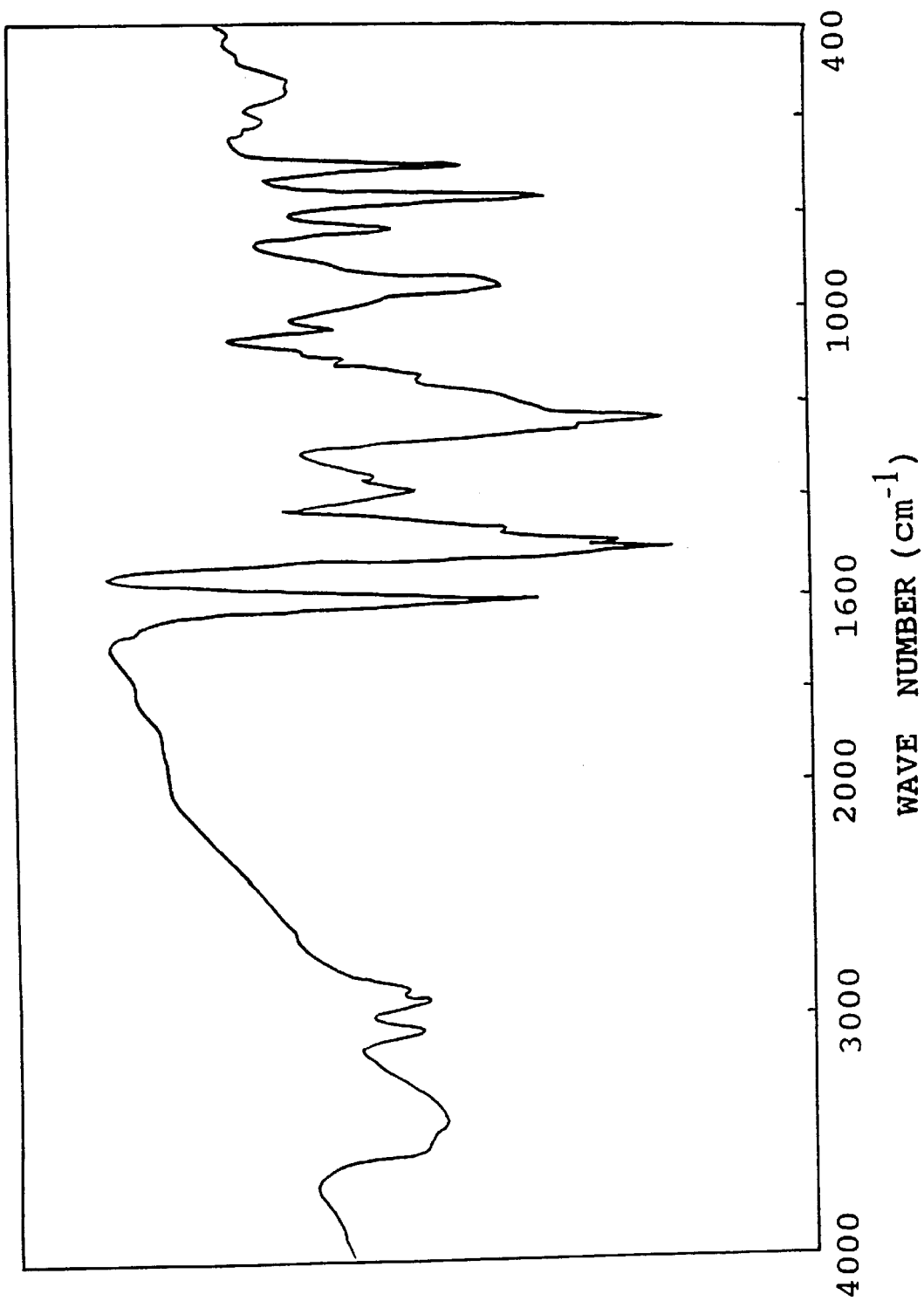
FIG. 11 is an IR spectrum of the thermosetting compound obtained in Example 4.
Figure 15:
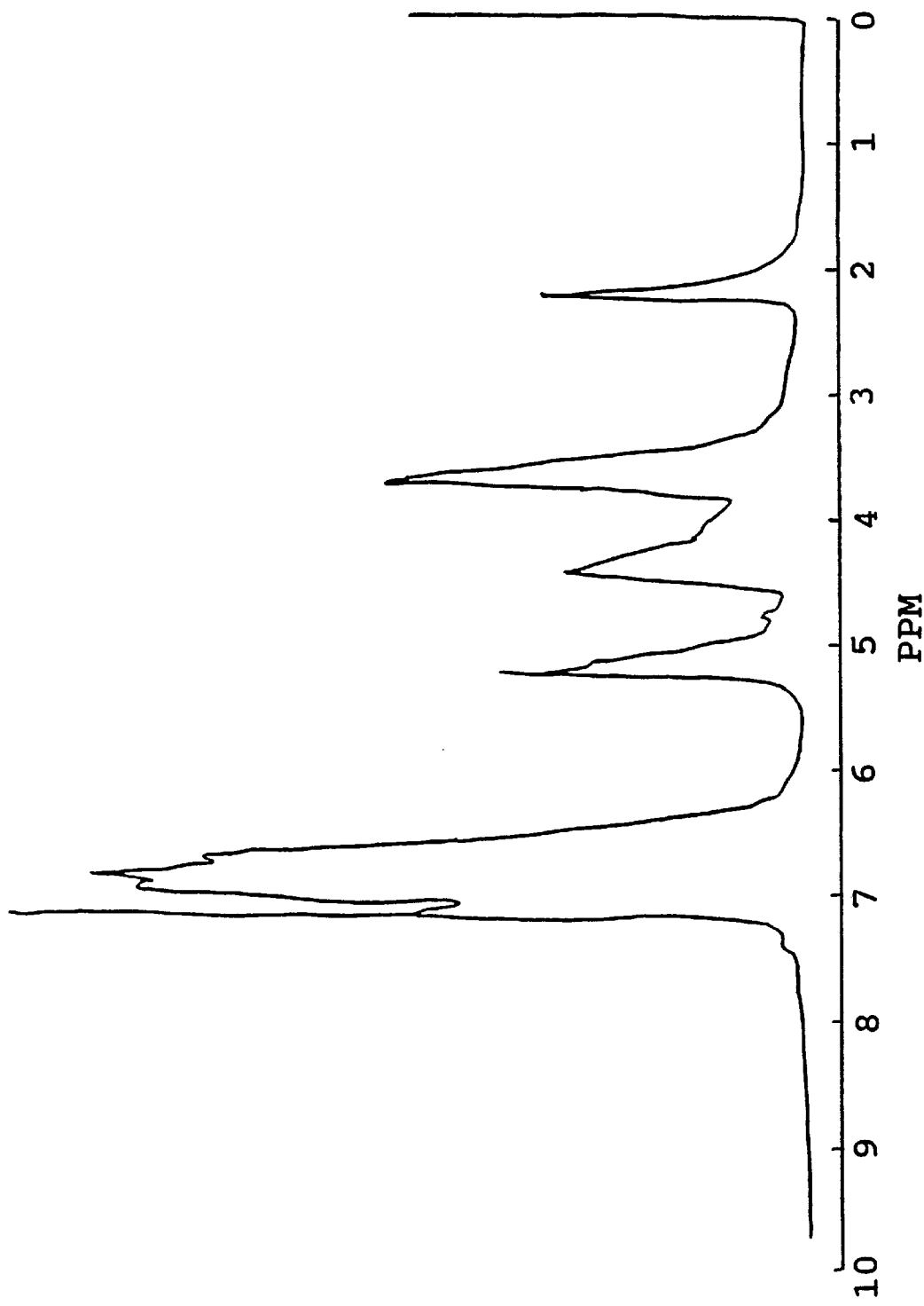
FIG. 15 is a NMR spectrum of the thermosetting compound obtained in Example 4.

The procedure of Example 1 was repeated with the exception that a mixture of 0.70 kg of aniline and 0.27 kg of toluidine was used in place of aniline, to obtain a thermosetting resin wherein dihydrobenzoxazine rings were introduced. The obtained thermosetting compound was resulted by the conversion of 71% of the reactive hydroxyl groups of the phenol novolac resin into dihydrobenzoxazine rings. FIG. 7 shows the molecular weight distribution curve measured in the same manner as FIG. 1, FIG. 11 shows the IR spectrum, and FIG. 15 shows the NMR spectrum of the obtained thermosetting compound. The properties of the cured product are listed in Table 1.

EXAMPLE 5

35% (% by weight, this is to be repeated in the following) of the thermosetting compound obtained in Example 1, 45% of a glass fiber of 10 μm in average fiber diameter, 18% of talc, 1% of zinc stearate, 0.5% of a silane coupling agent and 0.5% of carbon black were mixed, and the mixture was kneaded with heated mixing rolls at 95° C. for three minutes and pulverized, to obtain a powdery composition. The composition was molded at a mold temperature of 200° C., at 4.9 MPa for 10 minutes, to obtain a molded product of a plate form. The properties of the cured product are listed in Table 1.

Comparative Example 1

A thermosetting compound wherein dihydrobenzoxazine rings were introduced was prepared in the same manner as in Example 1 with the exception that 1.70 kg (corresponding to 16 moles of hydroxyl groups) of the phenol novolac resin synthesized in Example 1, 1.49 kg (16 moles) of aniline and 2.59 kg of formalin were used. A cured product was produced by using the thermosetting compound in the same manner as in Example 1. The properties of the cured product are listed in Table 2.

Comparative Example 2

10 parts (parts by weight, this is to be repeated in the following) of hexamethylenetetramine was added to 100 parts of the phenol novolac resin synthesized in Example 1, and the mixture was cured in the same manner as in Example 1. The properties of the cured product are listed in Table 2.

Comparative Example 3

A resin was synthesized in a 10-liter flask in the same manner as in Example 1 by using 1.69 kg (18 moles) of phenol in place of the phenol novolac resin synthesized in Example 1, 1.67 kg (18 moles) of aniline and 2.92 kg of formalin.

When the resins was cured in the same manner as in Example 1, softening occurred remarkably at the time of release from the mold, and the measurements of mechanical properties could not be made. The cured product was very brittle, indicating the insufficient curing. The properties of the cured product are listed in Table 2.

Comparative Example 4

The procedure of Comparative Example 3 was repeated with the exception that the curing time was changed to one hour. Softening also occurred at the time of release from the mold but was slight as compared with that in Comparative Example 3. The properties of the cured product are listed in Table 2.

Comparative Example 5

As disclosed in Comparative Example 3, a resin was synthesized in the same manner as in Example 1 with the exception that 1.69 kg (18 moles) of phenol, 1.12 kg (12 moles) of aniline and 1.95 kg of formalin were used.

When the thermosetting resin was cured in the same manner as in Example 1, softening also occurred at the time of release from the mold but was slight as compared with that in Comparative Example 3.

In the evaluation of the properties of the cured products, mechanical properties were evaluated according to JIS K 6911, and heat resistance was evaluated by using a thermogravimetric thermomechanical analyzer, TG/DTA.TMA200 (produced by Seiko Electronic Industries, Ltd.). Flexural strength and Flexural modulus were measured at 23° C. and at a bending rate of 2 mm/min, glass transition temperature and the weight-reducing temperature were measured in air at a temperature-raising rate of 5° C./min, and inflammability was evaluated according to UL-94, by using plates of 3.6 mm thick.

In the Tables, the parentheses bracketing the glass transition temperature of Example 5 mean obscurity, and the parentheses for Comparative Examples 4 and 5 mean softening.

Further, though the flexural strengthes and flexural moduluses of the cured products of Comparative Examples 3–5 are too weak, therefore, can not be measured, the cured products of the present invention have excellent flexural strengthes and flexural moduluses. These results mean that the cured products of the present inventions have excellent mechanical strengthes.

Further, though the cured product of Comparative Example 2 has many minute bubbles in the surface, the

TABLE 1

|  | Example 1 | Example 2 | Example 3 | Example 4 | Example 5 |
|---|---|---|---|---|---|
| Appearance of cured product | Red Transparent | Red Transparent | Yellow orange Transparent | Red Transparent | Black |
| Surface of cured product | Even | Even | Even | Even | Even |
| Flexural strength (MPa) | 171.5 | 158.8 | 137.2 | 160.7 | 258.7 |
| Felxural modulus (MPa) | 5684 | 5782 | 4410 | 5684 | 18816 |
| Glass transition temperature (° C.) | 201 | 205 | 162 | 194 | (220) |
| Temperature for 5%-weight reduction (° C.) | 383 | 390 | 415 | 380 | 442 |
| Flammability (UL-94) | V-0 | V-0 | V-0 | V-0 | V-0 |

TABLE 2

|  | Comparative Example 1 | Comparative Example 2 | Comparative Example 3 | Comparative Example 4 | Comparative Example 5 |
|---|---|---|---|---|---|
| Appearance of cured product | Red Transparent | Brown Cloudy | Red Transparent | Red Transparent | Black |
| Surface of cured product | Even | Many minute bubbles | Even | Even | Even |
| Flexural strength (MPa) | 149 | 29.4 | Could not be measured | Could not be measured | Could not be measured |
| Felxural modulus (MPa) | 5390 | 3822 | Could not be measured | Could not be measured | Could not be measured |
| Glass transition temperature (° C.) | 155 | Could not be measured | Melted during measurement | (118) | (127) |
| Temperature for 5%-weight reduction (° C.) | 325 | 302 | 310 | 312 | 321 |
| Flammability (UL-94) | V-0 | V-1 | Melted during measurement | V-0 | V-0 |

Though the thermosetting compound of the Comparative Example 3 was not cured completely when the curing time was 10 minutes, the thermosetting compounds of the present invention were cured completely in 10 minutes. These results mean that the thermosetting compounds of the present invention are speedily curable.

According to Tables 1 and 2, the temperatures for 5%-weight reduction of the cured products of the present invention are remarkably high comparing with those of the cured products of Comparative Examples 1–5. These results mean that the cured products of the present invention have excellent heat resistance comparing with those of conventional thermosetting resins.

Further, the cured products of the present invention show "V-O" as the results of flammability (UL-94). These results mean that the flames of-the cured products of the present invention were disappeared remarkably soon, therefore, the cured products of the present invention have excellent flammabilities.

cured products of the present invention have even surfaces. These results mean that the thermosetting compounds of the present invention generate no volatile matters during curing.

The thermosetting compound of the present invention is speedily curable and generates no volatile matters during curing, and the cured product exhibits excellent heat resistance and inflammability. The thermosetting compound of the present invention, therefore, is useful as a high performance molding material, varnish, coating material, adhesive, encapsulating materials for semiconductors, and material for laminates, FRP(Fiber Reinforced Plastics) and carbon goods.

What is claimed is:

1. A thermosetting compound containing, per molecule, at least one structural unit represented by the formula (A) and at least one structural unit represented by the formula (B);

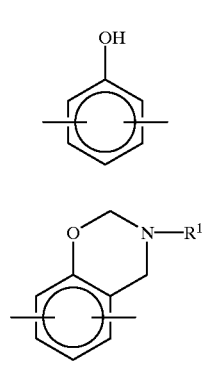

(A)

(B)

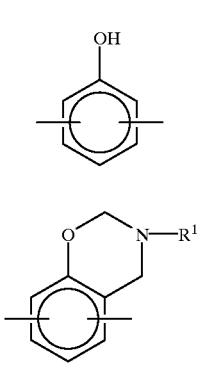

(A)

(B)

wherein R¹ is methyl, cyclohexyl, phenyl or a substituted phenyl substituted by at least one substituent selected from the group consisting of methyl group and methoxy group, and each hydrogen atom on the aromatic rings of (A) and (B) may optionally be replaced by a substituent selected from the group consisting of methyl group, t-butyl group and a halogen atom, with a proviso that each hydroxyphenylene group (A) contains at least one hydrogen ortho to the hydroxyl group, said thermosetting compound being a compound produced by reacting a primary amine and formaldehyde with a compound which contains at least two hydroxyphenylene groups per molecule and is selected from the group consisting of a phenol novolac resin, a phenol-modified xylene resin, an alkylphenol resin, a melamine-phenolic resin and a xylylene-modified phenolic resin, each hydroxyphenylene group containing at least one hydrogen ortho to the hydroxyl group, said primary amine being selected from the group consisting of aniline and toluidine, the primary amine being reacted in an amount of 0.2 to 0.752 moles, and said formaldehyde being reacted in an amount of at least double the molar quantity of the amine, based on one mole of the hydroxyl groups of the hydroxyphenylene groups containing at least one hydrogen ortho to each hydroxyl group.

2. The thermosetting compound of claim 1, wherein the compound which contains at least two hydroxyphenylene groups per molecule is a phenol novolac resin.

3. The thermosetting compound of claim 1, wherein the compound which contains at least two hydroxyphenylene groups per molecule is a xylylene-modified phenolic resin.

4. The thermosetting compound of claim 1, wherein the primary amine is reacted in an amount of 0.4 to 0.752 moles based on one mole of the hydroxyl groups of the hydroxyphenylene groups containing at least one hydrogen ortho to each hydroxyl group.

5. The thermosetting compound of claim 1, wherein the primary amine is reacted in an amount of 0.5 to 0.7 moles based on one mole of the hydroxyl groups of the hydroxyphenylene groups containing at least one hydrogen ortho to each hydroxyl group.

6. A cured product obtained by heating the thermosetting compound of claim 1 at a temperature of at least 150° C.

7. A method for manufacturing a thermosetting compound containing, per molecule, at least one structural unit represented by the formula (A) and at least one structural unit represented by the formula (B);

wherein R¹ is methyl, cyclohexyl, phenyl or a substituted phenyl substituted by at least one substituent selected from the group consisting of methyl group and methoxy group, and each hydrogen atom on the aromatic rings of (A) and (B) may optionally be replaced by a substituent selected from the group consisting of methyl group, t-butyl group and a halogen atom, the method comprising the step of:

reacting primary amine and formaldehyde with a compound which contains at least two hydroxyphenylene groups per molecule, selected from the group consisting of a phenol novolac resin, a phenol-modified xylene resin, an alkylphenol resin, a melamine-phenolic resin and a xylylene-modified phenolic resin, wherein on each hydroxyphenylene group a hydrogen atom is bonded at at least one ortho-position to the hydroxyl group, said primary amine being reacted in an amount of 0.2 to 0.752 moles and said formaldehyde being reacted in an amount of at least double the molar quantity of the amine, based on one mole of the hydroxyl groups of the hydroxyphenylene groups on said compound which contains at least two hydroxyphenylene groups per molecule.

8. The method for manufacturing the thermosetting compound according to claim 7, wherein the compound which contains at least two hydroxyphenylene groups per molecule is a phenol novolac resin having 200 to 3000 of number average molecular weight.

9. The method for manufacturing the thermosetting compound according to claim 7, wherein the primary amine is an aniline.

10. The thermosetting compound of claim 1, wherein the at least one structural unit represented by the formula (A) and the at least one structural unit represented by the formula (B) are included in said compound in a (A)/(B) molar ratio of 1/0.25 to 1/9.

11. The thermosetting compound of claim 10, wherein said (A)/(B) molar ratio is 1/0.67 to 1/9.

12. The thermosetting compound of claim 1, wherein the primary amine is an aniline.

13. The method for manufacturing the thermosetting compound according to claim 7, wherein the primary amine is reacted in an amount of 0.5 to 0.7 moles based on one mole of the hydroxyl groups of the hydroxyphenylene groups containing at least one hydrogen ortho to each hydroxyl group.

14. The method for manufacturing the thermosetting compound according to claim 7, wherein the primary amine is selected from the group consisting of aniline and toluidine.

* * * * *